(12) United States Patent
Wambsganss et al.

(10) Patent No.: US 7,408,132 B2
(45) Date of Patent: Aug. 5, 2008

(54) TEMPERATURE SENSOR FOR POWER SUPPLY

(75) Inventors: Peter Wambsganss, Bexbach (DE); Gareth J. Hackett, Bexbach (DE)

(73) Assignee: RRC power solutions GmbH, Homburg (DE)

( * ) Notice: Subject to any disclaimer, the term of this patent is extended or adjusted under 35 U.S.C. 154(b) by 0 days.

(21) Appl. No.: 10/984,551

(22) Filed: Nov. 8, 2004

(65) Prior Publication Data

US 2006/0098371 A1    May 11, 2006

(51) Int. Cl.
H05B 1/02    (2006.01)
(52) U.S. Cl. ................ 219/497; 219/202; 219/506; 219/494
(58) Field of Classification Search ......... 219/202–205, 219/494, 497, 499, 501, 506, 483, 507, 508
See application file for complete search history.

(56) References Cited

U.S. PATENT DOCUMENTS

| 4,094,565 | A |   | 6/1978 | Parrier et al. |
|---|---|---|---|---|
| 4,475,150 | A |   | 10/1984 | D—Atre et al. |
| 5,162,721 | A |   | 11/1992 | Sato |
| 5,347,211 | A |   | 9/1994 | Jakubowski |
| 5,369,352 | A |   | 11/1994 | Toepfer |
| 5,479,331 | A |   | 12/1995 | Lenni |
| 5,506,490 | A |   | 4/1996 | DeMuro |
| 5,601,441 | A |   | 2/1997 | Weinstein et al. |
| 5,636,110 | A |   | 6/1997 | Lanni |
| 5,686,808 | A | * | 11/1997 | Lutz ............................ 320/110 |
| 5,838,554 | A |   | 11/1998 | Lanni |
| 5,945,806 | A | * | 8/1999 | Faulk ........................... 320/127 |
| 5,949,213 | A |   | 9/1999 | Lanni |
| 5,959,849 | A |   | 9/1999 | Batarseh et al. |
| 6,091,611 | A |   | 7/2000 | Lanni |
| 6,172,884 | B1 |   | 1/2001 | Lanni |
| 6,175,303 | B1 |   | 1/2001 | Theofanopoulos et al. |
| 6,266,261 | B1 |   | 7/2001 | Lanni |
| 6,358,096 | B1 |   | 3/2002 | Beckman |
| 6,377,826 | B1 |   | 4/2002 | Kaneko |
| 6,459,175 | B1 |   | 10/2002 | Potega |
| 6,549,774 | B1 |   | 4/2003 | Titlebaum et al. |
| 6,643,158 | B2 |   | 11/2003 | McDonald et al. |
| 6,650,560 | B2 |   | 11/2003 | MacDonald et al. |
| 6,651,178 | B1 |   | 11/2003 | Voegeli et al. |
| 2003/0042881 | A1 |   | 3/2003 | Lanni |

(Continued)

FOREIGN PATENT DOCUMENTS

JP    WO91/17590    11/1991

*Primary Examiner*—Mark Paschall
(74) *Attorney, Agent, or Firm*—Knobbe Martens Olson & Bear, LLP

(57) ABSTRACT

A temperature sensor, such as a thermistor, senses the temperature inside a power source connector, or other portion, of a power supply. This sensed temperature may then be used to determine if the output power should be reduced or switched off in order to avoid overheating of the connector, or other portion of the power supply. Overheating of the power supply may occur, for example, if contact between the connector and a cigarette lighter power receptacle is incomplete. A microcontroller may be used to monitor the temperature sensed by the temperature sensor and reduce or disable the power supply if the temperature is above a threshold temperate. Accordingly, heat damage to the plastic components of the power supply, the cigarette lighter receptacle, may be reduced.

20 Claims, 3 Drawing Sheets

U.S. PATENT DOCUMENTS

| | | |
|---|---|---|
| 2003/0126477 A1 | 7/2003 | Zhang et al. |
| 2003/0128020 A1 | 7/2003 | Lanni |
| 2003/0132668 A1 | 7/2003 | Lanni |
| 2005/0138437 A1 | 6/2005 | Allen et al. |
| 2005/0162020 A1 | 7/2005 | Lanni |

* cited by examiner

TEMPERATURE SENSOR FOR POWER SUPPLY

RELATED APPLICATIONS

This application is related to, and hereby incorporates by reference the entire disclosure of each of the following commonly owned U.S. patent applications, each filed on even date herewith: (1) U.S. patent application Ser. No. 10/984,552, titled "Microcontroller Controlled Power Supply," (2) U.S. patent application Ser. No. 10/984,695, titled "Power Supply Configured to Detect a Power Source," and (3) U.S. patent application Ser. No. 10/984,550, titled "Power Supply Connector."

BACKGROUND OF THE INVENTION

1. Field of the Invention

This invention relates to power supplies and, more specifically, to power supplies configured to monitor temperature of components external to a power supply housing.

2. Description of the Related Art

In order to power many electronic devices, such as household appliances, stereo components, and computing devices, for example, those devices typically include a power supply configured for coupling with an external power source. External power sources may include wall outlets, cigarette lighters in automobiles or other vehicles, and in seat power delivery systems in aircraft.

Power supplies typically include at least two connecting cables, one for coupling with a power source and another for coupling with an electronic device. Each of these cables includes respective connectors for coupling with the power source and electronic device. In the event that short circuits or other faults occur in one or more of the electrical cables, the heat generated by the short circuit may melt the plastic cable housing, potentially causing further damage to the cable, the power, supply, the power source, the electronic device, and the user of the power supply. However, current power supplies do not monitor the temperature of anything outside the main power supply housing and such an overheating condition may not be recognized. Accordingly, systems and methods for monitoring the temperature of components outside of the power supply housing portion of the power supply, such as cables and connectors, are desired.

For many types of power sources, the mechanical-configuration of a connection portion of the power source is standardized. Thus, power supply manufacturers may develop power supplies according to the applicable standard for a particular type of power source and have a reasonable assurance that the power supply will be compatible with that type of power source. For example, the receptacle of a vehicle cigarette lighter located in an automobile, water vehicle, or other recreational vehicle (referred to herein generally as a "vehicle receptacle") is standardized so that manufacturers may produce power supplies for various electronic devices that may be powered via the vehicle receptacle. However, some automobiles are not in compliance with the standardized vehicle receptacle specifications. Thus, power supplies having standardized vehicle connectors may not properly engage with these out of specification vehicle receptacles. In addition, even a vehicle receptacle designed in compliance with standardized vehicle receptacle specification may have an incomplete connection with a power supply connector. If a vehicle connector is incompletely contacting the vehicle receptacle, there is a possibility for heat generation in the vehicle connector and melting or other damaging of components in the connector.

Accordingly, systems and methods for monitoring a temperature of various portions of a power supply, such as the vehicle connector, are desired. In addition, systems and methods for reducing damage to a power supply when an overheating situation is detected, such as may be caused by an incomplete or improper connection between a power supply connector and a vehicle receptacle, are desired.

SUMMARY OF THE INVENTION

A temperature sensor, such as a thermistor, senses the temperature of a power supply connector, or other portion of the power supply, such as an electrical cable. This sensed temperature may then be used to determine, such as by a microcontroller or other power control module, if the output power should be reduced or switched off in order to avoid overheating of a cigarette lighter. This may prevent damage to the plastic components of the power supply, the cigarette lighter receptacle, and the electronic device coupled to the power supply.

In one embodiment, a power supply configured to receive electrical power from a cigarette lighter receptacle in a vehicle comprises a power supply housing configured to house a power module, a microcontroller electronically coupled to the power module and configured to control a power signal transmitted from the power module, and a temperature sensor disposed outside of the power supply housing and configured to sense a temperature of a portion of the power supply and transmit an indication of the sensed temperature to the microcontroller.

In another embodiment, a method of reducing overheating of a power supply configured to receive a power signal from a vehicle through a cigarette lighter receptacle comprises sensing a temperature of at least a portion of the power supply, determining if the sensed temperature is greater than a predetermined threshold; and reducing a power level of the power supply in response to determining that the sensed temperature is greater than a predetermined threshold temperature.

In another embodiment, a power supply comprises a power module configured to convert a power signal received from a power source, a connector configured to couple the power module with the power source, a first temperature sensor disposed proximate the power module and configured to sense a temperature of the power module, and a second temperature sensor disposed in the connector and configured to sense a temperature of the connector, and a power control module configured to reduce a power level of a power signal transmitted from the power supply in response to determining that the temperature of the connector is greater than a predetermined threshold temperature.

In another embodiment, a system for reducing overheating of a power supply configured to receive a power signal from a cigarette lighter receptacle in a vehicle comprises means for sensing a temperature of at least a portion of the power supply, means for determining if the sensed temperature is greater than a predetermined threshold, and means for reducing a power level of the power supply in response to determining that the sensed temperature is greater than a predetermined threshold temperature.

BRIEF DESCRIPTION OF THE DRAWINGS

These and other objects and features of the invention will become more apparent from the following description and appended claims taken in conjunction with the following drawings, wherein like reference numbers indicate identical or functionally similar elements.

DETAILED DESCRIPTION OF THE PREFERRED EMBODIMENT

The following is a detailed description of embodiments of the invention. However, the invention can be embodied in a multitude of different ways as defined by the claims. The invention is more general than the embodiments that are explicitly described, and accordingly, is not limited by the specific embodiments.

Figure 1:
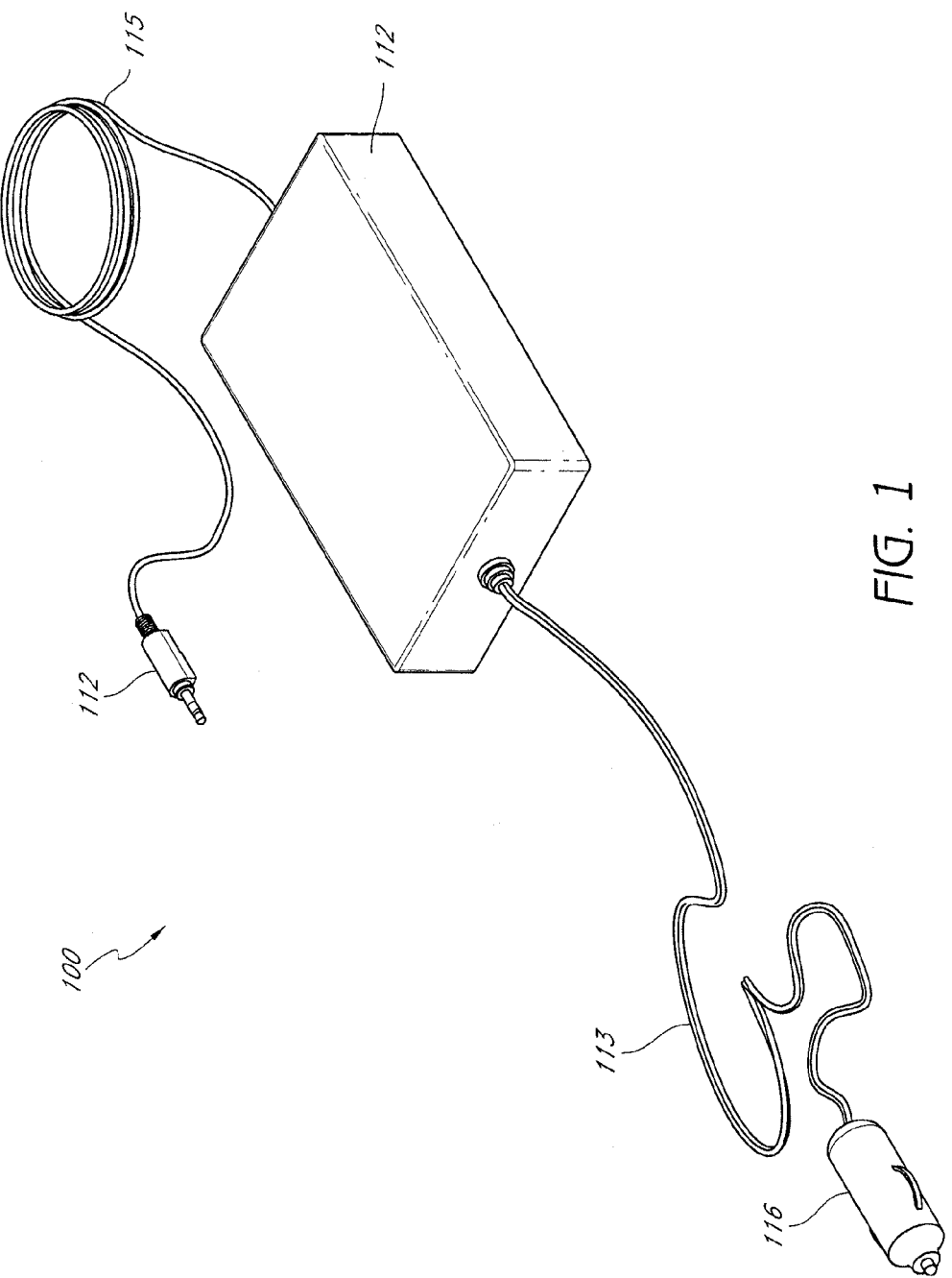
FIG. 1 is an illustration of a power supply, including connectors for connecting with a power source and an electronic device.

FIG. 1 is an illustration of a power supply 100, including a power supply housing 112, a power source connector 116, an electronic device connector 114, and electrical connection lines 113 and 115 coupling the power source and the electronic device, respectively, to the power supply 112. In operation, the power source connector 116 is coupled to a power source through a connector, such as a cigarette lighter receptacle in a vehicle (referred to herein as a "vehicle receptacle") or an in-seat power receptacle in an aircraft (referred to herein as an "air receptacle"). The power is delivered to the power supply housing 112, which includes power conversion and/or transformation circuitry, via the power source connection lines 113, which typically include multiple electrical wires surrounded by an insulative material, such as plastic. An output power signal is then transmitted from the power supply housing 112 to the electronic device connector 114 via the electrical connection lines 115, which typically include multiple electrical wires surrounded by an insulative material, such as plastic.

Figure 2:
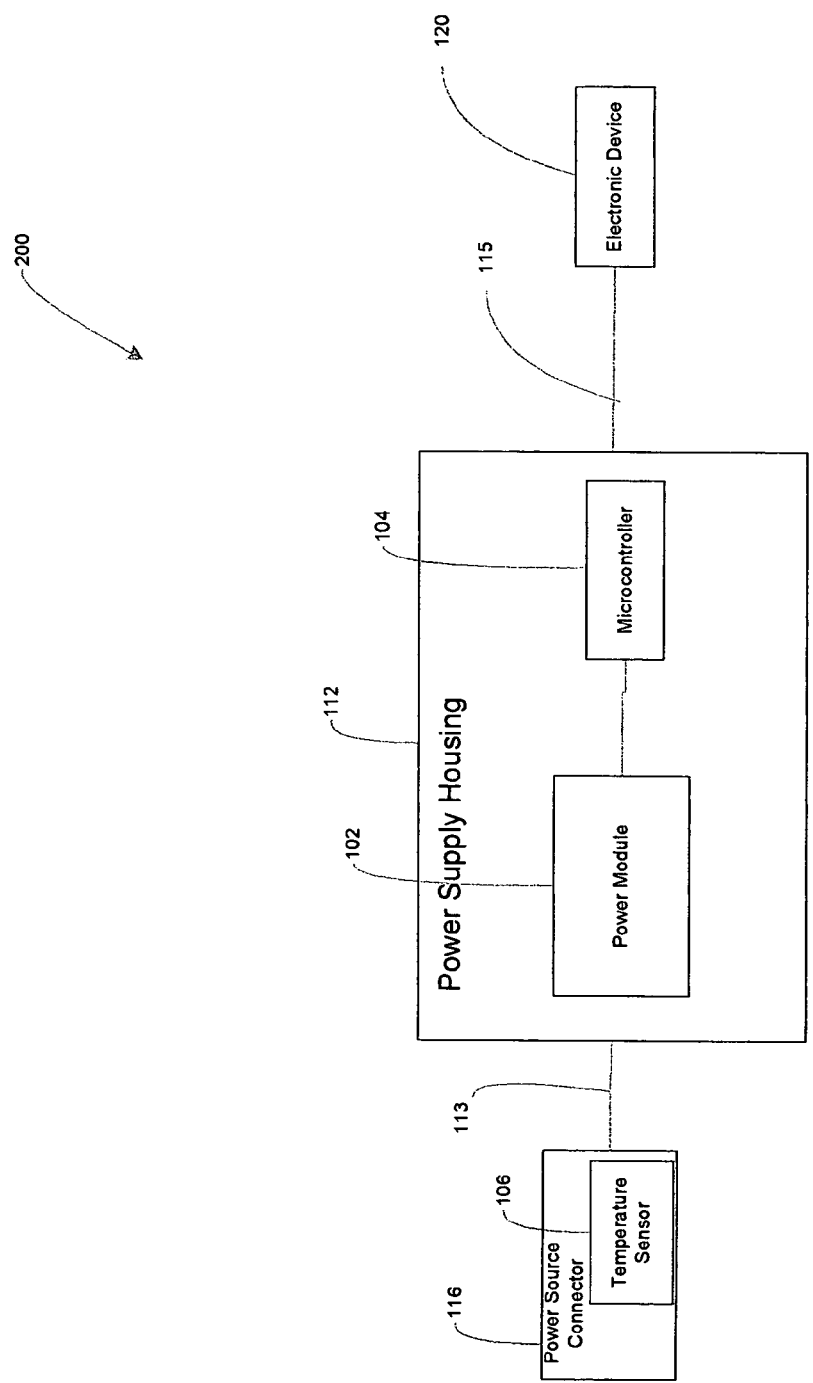
FIG. 2 is a block diagram of a power supply coupled to an electronic device.

FIG. 2 is a block diagram of the power supply 200 coupled to an electronic device 120. The exemplary power supply 200 comprises a power module 102 including power delivery components that are configured to transform and/or convert power from a power source and delivers this power to the electronic device 120. In one embodiment, the power supply 200 also includes a microcontroller 104 coupled to the power module 102 and configured to control the output voltage level from the power module 102. In one embodiment, the coupling of the microcontroller 104 to the power module 102 is via one or more amplifiers, diodes, and other electronic components. Co-pending U.S. patent application Ser. No. 10/984,552, titled "Microprocessor Controlled Power Supply," filed concurrently herewith, which is hereby incorporated by reference for all purposes, describes exemplary systems and methods of controlling a power supply output with a microprocessor.

In the embodiment of FIG. 2, a temperature sensor 106 is disposed in the power source connector 116. However, as discussed above, the temperature sensor may be located in any other portion of the power supply 200 outside of the power supply housing 112. For example, the temperature sensor 106 may be located in, the connecting lines 113 or 115. In another embodiment, the temperature sensor 106 may include multiple temperature sensors located in locations outside of the power supply housing 112, such as in the connector 116 and the power supply connecting lines 113. Thus, by placing one or more temperature sensors in locations that are susceptible to shorting, incomplete connections, or other faults that may cause heating, the temperature of these locations may be monitor and controlled, as explained below. The description below refers to the temperature sensor 106 disposed in the power supply connector 116 for ease of description and is not intended to limit the placement of temperature sensor 106 in other locations.

In one embodiment, the temperature sensor 106 is used in addition to a temperature sensor that is located proximate to the power module 102, such as in the power supply housing 112. The temperature sensor in the power supply housing 112 may be configured to monitor the temperature of the power module 102 or other portions of the power supply housing 112, such as a temperature of the plastic components comprising the power supply housing 112. This temperature sensor may also be coupled to the microcontroller 104, wherein the microcontroller 104 is configured to disable or limit a power output of the power supply 200 based on a temperature level of the temperature sensor. In another embodiment, the temperature sensor in the power supply housing 112 is coupled directly to the power module 102 so that when a predetermined temperature is reached, the power module 102 is disabled.

In an advantageous embodiment, the temperature sensor 106 is in data communication with the microcontroller 104, such as by a data line included in the connection lines 113. The temperature sensor 106 outputs an indication of the temperature of at least a portion of the power supply in which the temperature sensor 106 is located, such as the connector 116, to the microcontroller 104. The microcontroller 104 may then determine if the current output power should be adjusted based on the temperature results. In one embodiment, if the temperature has exceeded a predetermined threshold temperature, the microcontroller 104 reduces the output power level of the power supply 100, thus reducing risk of mechanical damage to the power supply 200, such as melting of the connector 116. In another embodiment, if the temperature of the connector exceeds a predetermined threshold temperature, the power supply 200 is disabled.

In one embodiment, the microcontroller 104 reduces the output power level to a determined level in response to receiving a temperature indication from the temperature sensor 106 that exceeds a predetermined threshold. For example, if the temperature sensor indicates that a temperature of the power supply plug exceeds a temperature of 100° Celcius, the microcontroller may be configured to reduce the output power to 75 Watts. Those of skill in the art will recognize that the temperature threshold may be set to any level, and the corresponding output power signal may also be set to any power level which the power supply 100 is capable of delivering.

Figure 3:
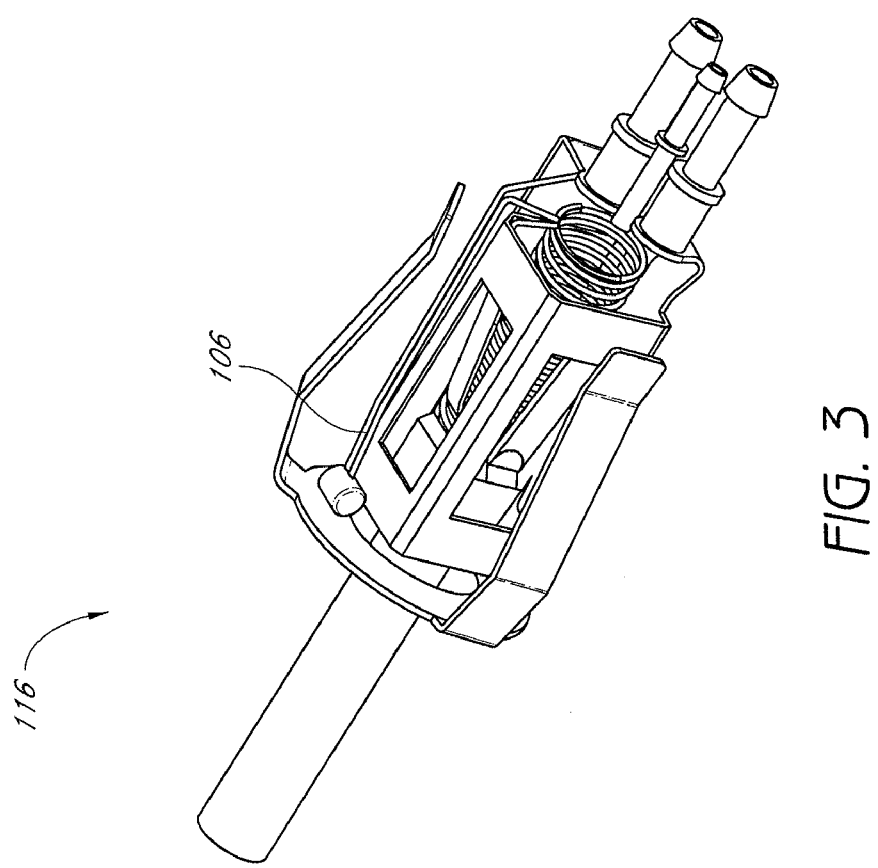
FIG. 3 is a cutaway side perspective view of the exemplary power supply plug.

FIG. 3 is a cutaway side perspective view of one exemplary power supply connector 116. In the embodiment of FIG. 3, the temperature sensor 106 is located in the connector 116 so that the temperature of the connector 116 may be constantly, or periodically, monitored. In the event that there is incomplete contact between electrical leads of the connector 116 and a vehicle receptacle, for example, the connector 116 may emit excessive heat. The temperature sensor 206 will sense the temperature of the connector and transmit an indication of the temperature to the microcontroller 104, which may be configured to monitor the temperature of the connector and compare the temperature to one or more predetermined temperature thresholds.

In one embodiment, the temperature sensor 106 comprises a negative temperature coefficient ("NTC") or positive temperate coefficient ("PTC") resistor that changes resistance as the temperature changes. In the case of a NTC resistor, as the temperature increases, the resistance of the NTC resistor decreases. If the temperature sensor 106 comprises an NTC resistor, for example, the temperature sensor 106 may also include a sensor for measuring the resistance of the NTC resistor, such as an ohmmeter, that is configured to output an indication of the resistance level to the microcontroller 104. In another embodiment, the terminals of the NTC resistor are coupled directly to the microcontroller 104, via the connection lines 113, for example, and the microcontroller 104 is configured to determine a resistance level of the NTC resistor and a temperature corresponding to the determined resistance level.

In another embodiment, the temperature sensor 106 comprises an integrated circuit that ouputs a data signal to the microprocessor indicating a temperature and/or indicating whether the a power level of the output power signal should be adjusted. For example, the temperature sensor 106 may include an integrated circuit having a temperature sensor and circuitry configured to convert a reading from the temperature sensor to a digital representation of the temperature. In this embodiment, the integrated circuit communicates this digital representation to the microcontroller 104.

Those of skill in the art will recognize that various other components may be used to determine a temperature in the temperature sensor 106. The systems and methods described herein are not specific to any type of temperature sensor and, to the contrary, expressly anticipate use of various types of temperature sensor placed in various locations of the power supply 200.

As discussed above, the microcontroller 104 receives a temperature indication from the temperature and may then adjust the output power level of the power supply 200 according to a preset default. In one embodiment, if the temperature measured by the temperature sensor 206 exceeds a first threshold, the microcontroller 104 reduces the power level of the output power signal to a first predetermined level. If the temperature measured by the sensor 206 is above a second threshold, the microcontroller 104 may be configured to disable the power module 102 and cease power output. By reducing the power output in the above discussed manner, the plastic components of the connector 116, or other portion of the power supply 200, are prevented from melting and other components are prevented from enduring excessive heat that may damage these components. Because connectors, cables, and other power supply components may comprise various materials with various heat dissipation capabilities, the threshold temperatures may be different for each connector and/or power supply.

In one embodiment, the power supply 200 may include an indicator providing a visual indication of when output power level has been reduced. For example, the power supply 100 may include a LED that is activated when the output power level is reduced to a predetermined threshold. In one embodiment, the visual indicator is located on the connector 116, but may be located in other locations on the power supply 200.

Specific parts, shapes, materials, functions and modules have been set forth, herein. However, a skilled technologist will realize that there are many ways to fabricate the system of the present invention, and that there are many parts, components, modules or functions that may be substituted for those listed above. While the above detailed description has shown, described, and pointed out the fundamental novel features of the invention as applied to various embodiments, it will be understood that various omissions, substitutions, and changes in the form and details of the components illustrated may be made by those skilled in the art, without departing from the spirit or essential characteristics of the invention.

What is claimed is:

1. A power supply configured to receive electrical power from a cigarette lighter receptacle in a vehicle, the power supply comprising:
    a power supply housing configured to house a power module,
    a microcontroller electronically coupled to the power module and configured to control a power signal transmitted from the power module;
    a connector configured to engage a cigarette lighter receptacle, the connector being coupled to the power supply housing via an elongated cable housing one or more electrical wires; and
    a temperature sensor disposed in the connector and configured to sense a temperature of the connector and transmit an indication of the sensed temperature to the microcontroller.

2. The power supply of claim 1, wherein the microcontroller is further configured to reduce a level of the power signal in response to determining that the sensed temperature is above a predetermined threshold temperature.

3. The power supply of claim 1, wherein the power signal comprises a voltage level and a current level.

4. The power supply of claim 1, wherein the predetermined threshold temperature is selected from the group comprising: about 80, 90, 100, 110, 120, 130, 140, and 150 degrees centigrade.

5. The power supply of claim 1, wherein the microcontroller is further configured to disable the power module in response to determining that the sensed temperature is above a predetermined threshold temperature.

6. The power supply of claim 1, wherein the temperature sensor transmits the indication of the sensed temperature to the microcontroller via one or more electrical connection lines coupling the connector and the power supply housing.

7. The power supply of claim 1, wherein the temperature sensor comprises a negative temperature coefficient resistor.

8. The power supply of claim 1, wherein the temperature sensor comprises an integrated circuit.

9. A method of reducing overheating of a power supply configured to receive a power signal from a vehicle through a cigarette lighter receptacle, the method comprising:
    sensing a temperature of a connector of the power supply, the connector being configured to engage a cigarette lighter receptacle;
    determining if the sensed temperature is greater than a predetermined threshold; and
    reducing a power level of the power supply in response to determining that the sensed temperature is greater than a predetermined threshold temperature.

10. The method of claim 9, wherein the at least a portion of the power supply comprises a connector configured to engage with the cigarette lighter receptacle.

11. The method of claim 9, wherein the at least a portion of the power supply comprises an electrical cable connecting the power supply to a power source connector.

12. The method of claim 9, wherein the at least a portion of the power supply comprises an electrical cable connecting the power supply to an electronic device connector.

13. The method of claim 9, wherein the predetermined threshold temperature is selected from the group comprising: about 80, 90, 100, 110, 120, 130, 140, and 150 degrees centigrade.

14. A power supply comprising:
a power module configured to convert a power signal received from a power source,
a connector configured to couple the power module with the power source;
a first temperature sensor disposed proximate the power module and configured to sense a temperature of the power module;
a second temperature sensor disposed in the connector and configured to sense a temperature of the connector; and
a power control module configured to reduce a power level of a power signal transmitted from the power supply in response to determining that the temperature of the connector is greater than a predetermined threshold temperature.

15. The power supply of claim 14, wherein the power level of the power signal transmitted from the power supply is reduced to about zero watts.

16. The power supply of claim 14, wherein the power control module comprises a microcontroller in data communication with the second sensor.

17. The power supply of claim 14, wherein the power control module is further configured to disable output of the power signal from the power supply in response to determining that the temperature of the power module is greater than another predetermined threshold temperature.

18. The power supply of claim 14, wherein the power supply is coupled to the power source via a cigarette lighter receptacle.

19. The power supply of claim 14, wherein the power supply is coupled to the power source via an in-seat power delivery receptacle.

20. A system for reducing overheating of a power supply configured to receive a power signal from a receptacle in a vehicle or in an aircraft, the system comprising:
means for sensing a temperature of at least a portion of the power supply, the sensing means being positioned within a connector that is configured to mechanically engage the receptacle;
means for determining if the sensed temperature is greater than a predetermined threshold; and
means for reducing a power level of the power supply in response to determining that the sensed temperature is greater than a predetermined threshold temperature.

* * * * *